United States Patent Office 3,367,873
Patented Feb. 6, 1968

3,367,873
TRANSMITTING POWER WITH SILPHENYLENE-SILOXANE FLUIDS
Robert L. Merker, Pittsburgh, Pa., assignor to Dow Corning Corporation, Midland, Mich., a corporation of Michigan
No Drawing. Original application Feb. 27, 1963, Ser. No. 261,514, now Patent No. 3,332,973, dated July 25, 1967. Divided and this application June 13, 1967, Ser. No. 645,592
9 Claims. (Cl. 252—78)

ABSTRACT OF THE DISCLOSURE

The process of transmitting power from one place to another is improved by the use of new silphenylene-siloxane fluids that not only have thermal stability at high temperatures but also exhibit a relatively small change in viscosity with changing temperature.

Specification

This application is a division of my application Serial No. 261,514, filed February 27, 1963, which is now U.S. Patent 3,332,973, dated July 25, 1967.

This application relates to an improvement in the transmission of power from one place to another with new silphenylene-siloxane fluids.

More particularly, this invention relates to an improvement in a process of transmitting power from one place to another via a fluid medium which comprises using a silphenylene-siloxane copolymer selected from the group consisting of those having the average general formulae

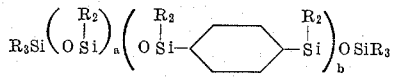

and

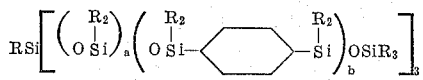

wherein each R is independently selected from the group consisting of methyl and 3,3,3-trifluoropropyl radicals, $a$ and $b$ are integers such that the ratio of $a$ to $b$ is in the range from 1:1 to 12.5:1, said copolymers having viscosities from 15 to 350,000 cs. at 25° C.

The fluid copolymers of this invention are useful, for example, as lubricants, dielectric coolants, damping and viscous drive fluids and as viscosity index improves for silicate and other hydraulic fluids. The fluid copolymers of this invention are particularly useful at high temperatures because of their thermal stability and the fact that they combine thermal stability with a relatively small change in viscosity with changing temperature.

It should be understood that the various siloxane units can be arranged in any configuration within the limits set by the above average formulae. For example, within any particular molecule, the R$_2$SiO and the silphenylene units can be arranged in a regular or in a random manner and the R$_3$Si— and the RSi≡ groups can be attached to either the R$_2$SiO units or the silphenylene units or to both types of said units.

The compositions of this inventon can be prepared in several ways. For example, one can equilibrate linear or cyclic R$_2$SiO polymers with linear or cyclic silphenylene polymers. During the equilibration R$_3$Si— and RSi≡ units can be introduced by any convenient procedure. If desired one can cocondense

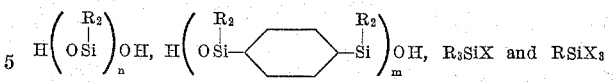

in which X is a hydroxyl reactive group such as acetoxy alkoxy, etc. Finally one can cohydrolyze the corresponding hydrolyzable silanes, i.e.

$R_2SiCl_2$, 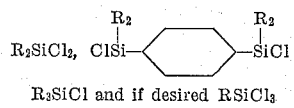

R$_3$SiCl and if desired RSiCl$_3$

All of these processes are well known in the organosilicon art. It will be clear to those skilled in the art that a combination of two or more of the above procedures can be used.

The best method known at this time for preparing the silphenylene-siloxane copolymer fluids consists of equilibrating the desired molar ratios of para-bis-(dimethylhydroxysilyl)benzene, dimethylsiloxane cyclics and a trimethylsilyl-endblocked polydimethylsiloxane fluid having a viscosity of from 0.65 to 300,000 cs. at 25° C. at a temperature of from 100° to 190° C. for 10 to 35 hours in the presence of an alkaline catalyst such as potassium hydroxide. It is preferred that a trimethylsilyl-endblocked polydimethylsiloxane having a viscosity of 1 to 100 cs. at 25° C., a temperature of 140° to 170° C. and a time of 15 to 30 hours be employed.

Any suitable alkaline catalyst can also be used. For example, the catalyst can be potassium hydroxide, sodium hydroxide, ammonium hydroxide, potassium dimethylsilanolate, etc.

The following examples are for the purpose of illustration only and should not be construed as limiting to the invention.

Example 1

247 g. of para-bis(dimethylhydroxysilyl)benzene, 265.5 g. of polydimethylsiloxane cyclics, 17.8 g. of a trimethylsiloxy-endblocked dimethylsiloxane fluid having a viscosity of 1.5 cs. at 25° C., about 530 g. of dry toluene and one percent potassium hydroxide (catalyst) were added to a reaction vessel and refluxed for 16 hours at 110° to 120° C. The catalyst was then neutralized with trimethylchlorosilane. The toluene and other low molecular weight materials were stripped from the fluid to 255° C. at a pressure of 1 mm. of mercury. The 452 g. of product obtained was treated with 2.5 g. of Nuchar (an activated charcoal) for 2 hours at 75° C. and then filtered thru Supercell (a diatomaceous silica). The filtered product consisted of 397.3 g. of a fluid having a viscosity of 385.5 cs. at 25° C.

Example 2

219 g. of para-bis(dimethylhydroxysilyl)benzene, 437.5 g. polydimethylsiloxane cyclics, 20.4 g. of a trimethylsiloxy-endblocked dimethylsiloxane fluid having a viscosity of 1.5 cs. at 25° C., about 677 g. of toluene and 1 percent of potassium hydroxide were added to a reaction vessel and refluxed for 16 hours at 114° to 115° C. The fluid was then neutralized with 7.0 g. of trimethylchlorosilane. The toluene and low molecular weight materials were stripped from the fluid to 269° C. at a pressure of 1 mm. of mercury. The 546 g. of product obtained was treated with 5 g. of Nuchar for 2 hours at 70° to 75° C. and then filtered thru Supercell. The filtered product consisted of 490 g. of a fluid having a viscosity of 209.5 cs. at 25° C.

*Example 3*

113 g. of para-bis(dimethylhydroxysilyl)benzene 200 g. of polydimethylsiloxane cyclics, 124 g. of a trimethylsiloxy-endblocked dimethylsiloxane fluid having a viscosity of 1.5 cs. at 25° C., 426 g. dry toluene and 4.3 g. of potassium hydroxide pellets were added to a reaction vessel and equilibrated for 18 hours at 110° to 120° C. The fluid was then neutralized with 12 g. of trimethylchlorosilane. The toluene and low molecular weight materials were stripped from the fluid at 250° C. at a pressure of 0.275 mm. of mercury. Then the product was treated with Nuchar and filtered. The filtered product consisted of 191.7 g. of a clear liquid having a viscosity of 36.6 cs. at 25° C.

*Example 4*

226 g. of para-bis(dimethylhydroxysilyl)benzene, 163 g. of octamethylcyclotetrasiloxane, 124 g. of a trimethylsiloxy-endblocked dimethylsiloxane fluid having a viscosity of 1.5 cs. at 25° C. and 5.0 g. of potassium hydroxide pellets were placed in a reaction vessel and equilibrated for 24 hours at 140° to 160° C. The catalyst was then neutralized with 10 g. of trimethylchlorosilane. The fluid was stripped of low molecular weight materials to 275° C. at a pressure of 0.15 mm. of mercury. The product was treated with 3 g. of Nuchar and then filtered thru Supercell. The filtered product consisted of 207.7 g. of a clear liquid having a viscosity of 59.5 cs. at 25° C.

*Example 5*

452 g. of para-bis(dimethylhydroxysilyl)benzene, 326 g. of octamethylcyclotetrasiloxane, 248 g. of a trimethylsiloxy-endblocked dimethylsiloxane fluid having a viscosity of 1.5 cs. at 25° C. and 10 g. of potassium hydroxide were added to a reaction vessel and equilibrated for 24 hours at 150° to 160° C. The fluid was then neutralized with 120 g. of tirmethylchlorosilane. The low molecular weight materials were stripped from the fluid to 335° C. at a pressure of 0.7 to 0.8 mm. of mercury. Nuchar was added to the fluid and it was filtered hot. 755 g. of a slightly hazy fluid was obtained. The fluid was then chilled with Dry Ice and filtered thru Supercell. The product had a viscosity of 142.6 cs. at 25° C.

*Example 6*

338 g. of para-bis(dimethylhydroxysilyl)benzene, 771 g. of polydimethylsiloxane cyclics, 7.5 g. of a trimethylsiloxy-endblocked dimethylsiloxane fluid having a viscosity of 5 cs. at 25° C. and 10 g. of the potassium salt of polydimethylsilanolate were added to a reaction vessel and heated for about 24 hours at 150° to 160° C. The fluid was then diluted with toluene, neutralized with Dry Ice and filtered. The toluene and other volatiles were stripped from the fluid in two stages, the first stage being to 170° C. at a pressure of 28 mm. of mercury and the second stage being at 300° C. at a pressure of 1 mm. of mercury. The 964 g. of product obtained was a fluid having a viscosity of about 5000 (i.e. 4959) cs. at 25° C.

Another fluid was prepared by the above procedure that was identical in every respect except that it had a viscosity of 5615 cs. at 25° C. This fluid was used as viscous drive fluid to transmit power in a fluid fan clutch. The fan clutch was equipped with a ten-horsepower electric motor having means for controlling the input speed. The fan clutch also had means for measuring both the input and output speeds. Power is transmitted within the clutch by the fluid between two flat, circular disks, one disk being connected to the motor by a shaft and the other disk being connected to the fan by a shaft. The output speed was first measured at various input speeds after being held at that input speed for 5 minutes. Then the input speed was hled steady and the output speed measured after varying lengths of times. These measurements are set forth in the table below and show this fluid to be useful for transmitting power.

| Input (r.p.m.) | Time | Output (r.p.m.) |
| --- | --- | --- |
| 2,000 | 5 minutes | 1,680 |
| 3,000 | 5 minutes | 1,875 |
| 4,000 | 5 minutes | 1,810 |
| 5,000 | 5 minutes | 1,700 |
| 5,000 | 1.1 hours | 1,665 |
| 5,000 | 3.0 hours | 1,645 |
| 5,000 | 4.1 hours | 1,640 |
| 5,000 | 5.1 hours | 1,640 |
| 5,000 | 6.5 hours | 1,635 |
| 5,000 | 22.2 hours | 1,625 |
| 5,000 | 24.5 hours | 1,610 |
| 5,000 | 26.5 hours | 1,615 |
| 5,000 | 29.7 hours | 1,610 |
| 5,000 | 46.2 hours | 1,770 |
| 5,000 | 49.2 hours | 1,930 |
| 5,000 | 50.7 hours | 2,140 |

*Example 7*

559 g. of para-bis(dimethylhydroxysilyl)benzene, 1287 g. of polydimethylsiloxane cyclics, 27 g. of a trimethylsiloxy-endblocked dimethylsiloxane fluid having a viscosity of 5 cs. at 25° C. and 18 g. of the potassium salt of polydimethylsilanolate were added to a reaction vessel and heated for about 20 hours at 150° C. The fluid then was cooled, diluted with toluene, neutralized with Dry Ice and filtered. The toluene and other volatiles were stripped from the fluid in two stages, the first stage being to 175° C. at a pressure of 25 mm. of mercury and the second stage being to 304° C. at a pressure of 0.1 mm. of mercury. The 1230 g. of product obtained was a fluid having a viscosity of 15,300 cs. at 25° C.

*Example 8*

This example illustrates the fact that the fluid silphenylene-siloxane copolymers of this invention have better thermal stability at high temperatures than similar fluids containing only methyl groups.

The thermal stability test consisted of heating the fluids, under nitrogen, in an oven at 250° C. for 24 hours. The viscosities of the fluids were measured at 25° C. both before and after they were heated in the oven. The fluid samples were prepared for the oven by placing them in a tube, evacuating the air from the tube, purging with nitrogen and then sealing the tube. The silphenylene-siloxane fluid used in the test was that of Example 6. The test results are set forth below and show that the percent change in the viscosity of the polydimethylsiloxane fluid was more than twice as great as the change in the viscosity of the silphenylene-siloxane fluid of this invention.

| Fluid | Viscosity at 25° C. | | Percent Change |
| --- | --- | --- | --- |
| | Before heating (cs.) | After heating (cs.) | |
| Silphenylene-siloxane | 4,959 | 3,595 | 27.5 |
| Polydimethylsiloxane | 5,070 | 1,858 | 63.3 |

*Example 9*

62.5 g. of a hydroxylated polydimethylsiloxane fluid having a degree of polymerization of about 18, 62.5 g. of para-bis(dimethylhydroxysilyl)benzene and 31 cc. tetrahydrofuran were refluxed until the monomers had dissolved. Then 22.4 g. of trimethylacetoxysilane was added and the mixture refluxed 2½ hours. Then, after the addition of 0.6 g. of tetramethylguanidine-di-2-ethylhexoate, the mixture was refluxed for one more hour. The mixture was then diluted with benzene and the acetic acid washed out with water. The benzene was then distilled off, and 0.10 percent by weight KOH, based on the monomers, was added. After removal of the water azeotrope, the mixture was refluxed for 2½ hours. The reaction products were washed with water, dried over $Na_2SO_4$ and then filtered. The product was clear and colorless and had a viscosity of 91 cs. at 25° C. The product was tested for thermal stability as above except that it was heated for 8 hours at 427° C. (800° F.). Before heating the fluid had a viscosity of 19.2 cs. at 100° C. (210° F.). After heating it was found to have a viscosity of 18.6 cs. at 100° C. (210° F.). This is a change in viscosity of only 3.1 percent.

Example 10

When an equivalent amount of bis(3,3,3-trifluoropropyl)siloxane cyclics are substituted for the dimethylsiloxane cyclics of Example 1, a silphenylene-siloxane copolymer fluid is obtained which contains 3,3,3-trifluoropropyl groups.

Example 11

When a mixture of dimethylsiloxane and bis(3,3,3-trifluoropropyl)siloxane cyclics are substituted for the polydimethylsiloxane cyclics of Example 3, a silphenylene-siloxane copolymer fluid is obtained which contains both methyl and 3,3,3-trifluoropropyl groups.

Example 12

When an equivalent amount of (methyl)3,3,3-trifluoropropylsiloxane cyclics are substituted for the dimethylsiloxane cyclics of Example 2, another silphenylene-siloxane copolymer fluid is obtained which contains both methyl and 3,3,3-trifluoropropyl radicals.

Example 13

When the desired ratios of $CH_3Si[OSi(CH_3)_3]_3$, $[(CH_3)_2SiO]_4$ and

are equilibrated in the presence of an alkaline catalyst a silpheneylene-siloxane copolymer fluid having the average general formula

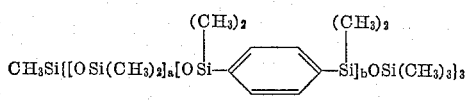

is obtained.

That which is claimed is:

1. In a process of transmitting hydraulic power from one place to another via a hydraulic fluid medium, the improvement which comprises using as a hydraulic fluid medium a silphenylene-siloxane copolymer selected from the group consisting of those having the average general formulae

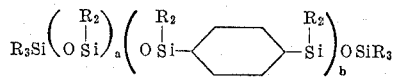

and

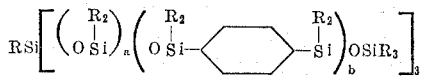

wherein each R is independently selected from the group consisting of methyl and 3,3,3-trifluoropropyl radicals, $a$ and $b$ are integers such that the ratio of $a$ to $b$ is in the range from 1:1 to 12.5:1, said copolymers having viscosities in the range from 15 to 350,000 cs. at 25° C.

2. The process of claim 1 wherein the copolymer is

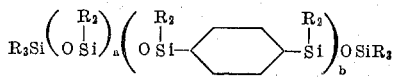

3. The process of claim 2 wherein the ratio of $a$ to $b$ is in the range from 3:1 to 7:1.

4. The process of claim 2 wherein all of the R groups are methyl radicals.

5. The process of claim 2 wherein the R groups are a mixture of methyl and 3,3,3-trifluoropropyl radicals.

6. The process of claim 1 wherein the copolymer is

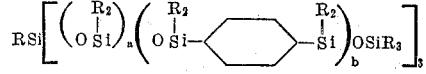

7. The process of claim 6 wherein the ratio of $a$ to $b$ is in the range from 3:1 to 7:1.

8. The process of claim 6 wherein all of the R groups are methyl radicals.

9. The process of claim 6 wherein the R groups are a mixture of methyl and 3,3,3-trifluoropropyl radicals.

No references cited.

LEON D. ROSDOL, *Primary Examiner.*

S. D. SCHWARTZ, *Assistant Examiner.*